United States Patent [19]
Orthman

[11] 3,941,194
[45] *Mar. 2, 1976

[54] FOLDING TOOL BAR HAVING A TRANSPORT BRACE

[75] Inventor: Henry K. Orthman, Lexington, Nebr.

[73] Assignee: Orthman Manufacturing, Inc., Lexington, Nebr.

[ * ] Notice: The portion of the term of this patent subsequent to Nov. 27, 1990, has been disclaimed.

[22] Filed: Oct. 3, 1973

[21] Appl. No.: 403,284

Related U.S. Application Data

[63] Continuation-in-part of Ser. No. 100,910, Dec. 23, 1970, Pat. No. 3,774,693.

[52] U.S. Cl. .................. 172/311; 16/138; 172/456; 172/481
[51] Int. Cl.² .................. A01B 15/14; A01B 73/00
[58] Field of Search .......... 172/126, 311, 456, 466, 172/481; 16/138, 139, 144, 147; 280/411–413

[56] References Cited
UNITED STATES PATENTS

| | | | |
|---|---|---|---|
| 1,211,733 | 1/1917 | McQueen | 16/138 |
| 1,708,328 | 4/1929 | Ring | 280/411 R |
| 2,767,866 | 10/1956 | Heinje | 280/411 B |
| 3,520,373 | 7/1970 | Stinemetz | 172/311 X |
| 3,529,672 | 9/1970 | Smith | 172/132 X |
| 3,554,295 | 1/1971 | Kopaska | 172/456 X |
| 3,774,693 | 11/1973 | Orthman | 172/311 |

Primary Examiner—Edgar S. Burr
Assistant Examiner—Paul T. Sewell
Attorney, Agent, or Firm—Zarley, McKee, Thomte & Voorhees

[57] ABSTRACT

A farm implement tool bar includes a hollow main frame and oppositely extending wing sections pivotal between horizontal and vertical positions. A hydraulic cylinder is connected to a mounting assembly including upper and lower mounting plates interconnected at their inner ends by a vertical post. The mounting plates are secured to the top and bottom walls of the main frame and the inner end of the hydraulic cylinder is connected to the vertical post. The outer end of the hydraulic cylinder is pivotally connected to an ear on the wing section. The lower adjacent edges of the main frame and wing section include sleeves adapted to register with each other for receiving a bolt to lock the wing section in its lowered position. A transport brace may be provided with its opposite ends movably secured to the main frame and wing section across the hinge. The transport brace includes telescopic sections which allow the wing section to be moved between the raised and lowered positions. When the wing section is in its raised position apertures in the telescopic sections are aligned for receiving a bolt thereby locking the wing section in the raised position. A sleeve is also carried on the brace for the holding bolt when the wing section is in its lowered position.

13 Claims, 4 Drawing Figures

U.S. Patent   March 2, 1976   3,941,194
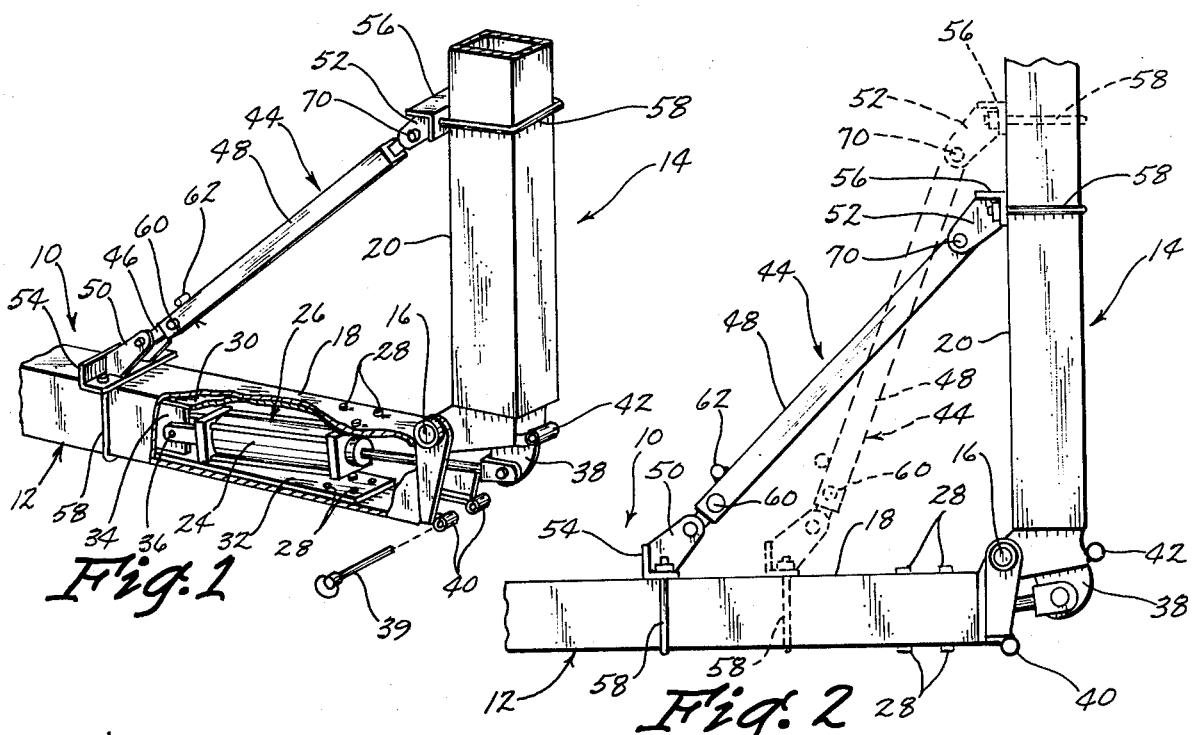
Fig. 1
Fig. 2
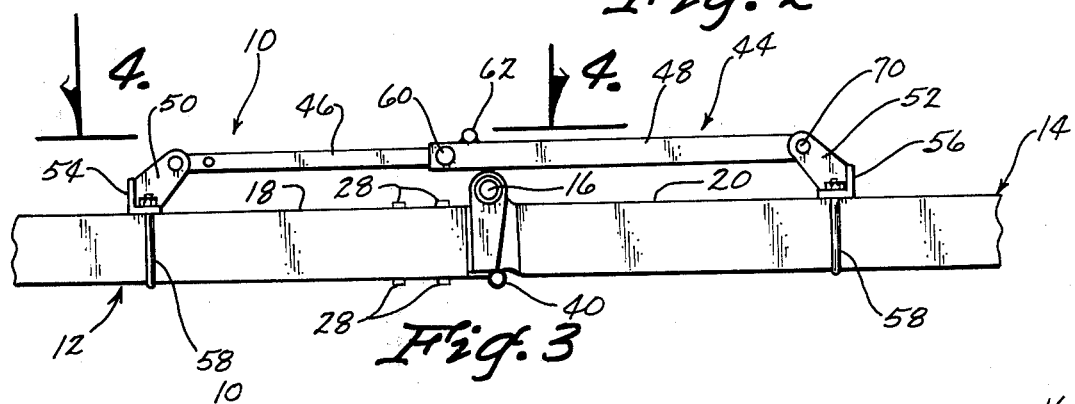
Fig. 3
Fig. 4

FOLDING TOOL BAR HAVING A TRANSPORT BRACE

This is a continuation in part of my parent application entitled AGRICULTURAL IMPLEMENT, Ser. No. 100,910, filed Dec. 23, 1970, now Pat. No. 3,774,693.

The tool bars on conventional farm implements wherein wing sections are utilized involve cumbersome hinges and power components on the tool bar which occupy considerable space thereby making it necessary to extend subframes rearwardly from the main tool bar frame to carry the necessary ground working tools in the area of the hinge and power assembly for raising and lowering the wing sections. These tool bars also suffer from the deficiency of having inadequate strength to resist damage from lateral strain placed on the wing sections when lowered and thus may require substantial reinforcing rods.

The farm implement tool bar of this invention is designed to carry ground engaging tools along its substantial length since a minimum of space is occupied by the hinge and power means for raising and lowering the wing sections. This is made possible by positioning a hydraulic cylinder inside the opposite ends of the main frame of the tool bar and providing an ear extending into the hollow ends of the main frame for engagement with the hydraulic cylinder. A hinge is placed immediately above the top side of the main frame and wing sections and occupies a minimum of space on the tool bar. The hydraulic cylinders are completely enclosed in the hollow tool bar main frame and wing sections when the wing sections are in the lowered horizontal position.

The hydraulic cylinder is readily bolted in the main frame and removed therefrom by a mounting assembly being provided which includes upper and lower mounting plates interconnected at their inner ends by a vertical post to which the inner end of the hydraulic cylinder is pivoted. The outer end of the hydraulic cylinder is pivoted to the ear on the wing section after the hydraulic cylinder and mounting assembly have been secured by bolts to the top and bottom walls of the main frame.

A pair of spaced apart sleeves are provided along the lower edge of the main frame for registry with a single sleeve on the lower edge of the wing section when the wing section is in its lowered position and a locking pin is provided to be received in the aligned sleeves to lock the wing section in its lowered position.

The wing section may be locked in its raised position by a transport brace being connected at its opposite ends to the main frame and wing section. The transport brace includes telescopic sections which extend and contract as the wing section is pivoted between raised and lowered positions. Openings in the telescopic sections are in alignment when the wing section is in its raised position and the locking pin may be positioned in the openings to maintain the wing section in the raised position. The transport brace does not interfere with mounting of tools on the tool bar since the brace may be selectively positioned along the tool bar and wing section to leave space for securing tools to the tool bar and wing section.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary perspective view of the wing section pivotally connected to the main frame having the hydraulic cylinder positioned therein and including the transport brace locking the wing section in its raised position.

FIG. 2 is a side elevation view thereof showing the transport brace in an alternate position as represented by the dash lines.

FIG. 3 is a side elevation view thereof showing the wing section in its lowered position with the telescopic sections of the transport brace extended.

FIG. 4 is a top plan view taken along line 4—4 in FIG. 3.

The tool bar of this invention is referred to generally as numeral 10 and includes a main frame 12 and a wing section 14 pivotally connected thereto by a hinge 16 positioned above the top walls 18 and 20, respectively, as seen in FIG. 3.

A hydraulic cylinder 24 in a mounting assembly 26 is positioned in a passageway in the main frame 12 and secured thereto by bolts 28 which connect the top and bottom walls of the main frame to top and bottom plates 30 and 32, respectively. A vertically disposed post 34 is provided at the inner end of the plates 30 and 32 and the power cylinder 24 is pivotally connected to the post 34 by a pin 36. The outer end of the cylinder 24 is pivotally connected to an ear 38 on the inner end of the wing section 14.

The wing section 14 may be locked in a lowered horizontal position as seen in FIG. 3 by a pin 39 being inserted through a pair of spaced apart sleeves 40 on the lower wall of the main frame which register with a sleeve 42 on the lower side of the wing section 14.

The wing section 14 is held in a raised position as seen in FIGS. 1 and 2 by a transport brace 44 which includes telescopic sections 46 and 48 pivotally connected to ears 50 and 52 at their outer ends which are carried on L shaped brackets 54 and 56 positioned on the top surfaces of the main frame and wing section for engagement with a U-bolt 58 embracing the tool bar. The brace extends over the hinge 16 due to being offset by the ears 50 and 52 and may be moved longitudinally along the tool bar as indicated by the dash line position in FIG. 2. This flexibility of movement permits location of tools on the tool bar as required for the particular job. The telescopic sections include apertures which are aligned when the wing section 14 is in its raised position and receive a pin 60 for locking the brace against being extended thereby holding the wing section 14 in its raised position. When the pin 60 is not in use it may be placed in a sleeve 62 on the telescopic section 48. It is noted that the operation of the wing section 14 between its raised and lowered positions is not adversely affected by the transport brace as it telescopes in and out smoothly and without interfering.

Thus in operation it is seen that the hydraulic cylinder 24 may be operated to raise and lower the wing section 14 as desired. The brace 44 will function as a stop against raising the wing section 14 too far when the telescopic section 46 bottoms out against the pin 70 connecting the telescopic section 48 to the ear 52. The brace 44 may be selectively moved along the tool bar as desired for locating working tools thereon by adjusting the U-shaped mounting bolts 58. The lowering of the wing section 14 is limited by the engagement of the end of the wing section 14 against the adjacent end of the main frame and in this lowered position as seen in FIG. 3 the pin 38 may be inserted through the sleeves 40 and 42 to lock the bar rigidly. The hydraulic cylinder may be easily inserted and removed from the main frame 12 by operation of the bolts 28 connecting the top and bottom support plates 30 and 32 to the top and bottom walls of the main frame. It is seen that only the outer ends of these plates are connected each by four bolts. The hydraulic cylinder 24 is free to pivot up and down about its pin connection 36 to the post 34 as the wing section 14 is pivoted up and down. Accordingly, a tool bar is provided that is unencumbered with exterior mounted power cylinder but is limited against damage to the cylinder by an automatically operable brace which limits upward movement of the wing section and downward movement is limited by cooperating stops on the wing section and main frame. It is further seen that the tool bar of this invention may be used for any kind of ground working tools heretofore utilized on conventional tool bar structures.

I claim:
1. An agricultural implement comprising,
   a tool bar carrying ground working tools thereon along its substantial length, said tool bar including a main frame and at least one wing section, said wing section pivotally movable between raised and lowered positions,
   a hinge pivotally interconnecting said wing section and main frame,
   said main frame having an elongated passageway in its end adjacent said wing section,
   a hydraulic cylinder connected at one end to said main frame and positioned in said passageway and pivotally connected at its opposite end to said wing section,
   a transport brace including interconnected telescopic sections, opposite ends of said brace connected to said main frame and wing section whereby said telescopic sections telescope as said wing section is moved between raised and lowered positions, and
   lock means for limiting telescopic extension of said telescopic sections and thereby limiting said wing section against moving to said lowered position.
2. The structure of claim 1 wherein fastening means connect said opposite ends of said telescopic section to said main frame and wing section and said fastening means are selectively adjustable for moving said connections along said tool bar as desired.
3. The structure of claim 1 wherein said telescopic sections include aligned openings when said wing section is in said raised position and said lock means is further defined as being a pin received in said aligned openings.
4. The structure of claim 3 wherein a sleeve is positioned on said brace to receive said pin.
5. The structure of claim 1 wherein said telescopic sections are connected to said main frame and wing section by U-bolts embracing said main frame and wing section.
6. The structure of claim 1 wherein
   said wing section includes an ear connected to said cylinder and said ear extends into said opening in said main frame when said wing section is in said lowered position.
7. The structure of claim 1 wherein said brace is positioned on the top side of said main frame and wing section and extends across said hinge.

8. The structure of claim 1 wherein sleeves are positioned on adjacent ends of said main frame and said one wing for registry therewith when in said lowered position and a bolt is received in said sleeves to lock said tool bar in said lowered position.
9. An argicultural implement comprising,
   a tool bar carrying ground working tools thereon along its substantial length, said tool bar including a main frame and at least one wing section, said wing section pivotally movable between raised and lowered positions,
   a hinge pivotally interconnecting said wing section and main frame,
   said main frame having an elongated passageway in its end adjacent said wing section,
   a hydraulic cylinder mounting assembly including upper and lower support plates interconnected at their inner ends by a vertically disposed post,
   a hydraulic cylinder positioned between said plates with one end pivotally connected to said post, said cylinder and mounting assembly being positioned in said passageway with the other end of said cylinder being pivotally connected to said wing section, said main frame having top and bottom walls, and said plates being connected to said top and bottom walls of said main frame.
10. The structure of claim 9 wherein
    said wing section includes an ear connected to said cylinder and said ear extends into said opening in said main frame when said wing section is in said lowered position.
11. An agricultural implement comprising,
    a tool bar including a main frame and at least one wing section, said wing section being pivotally movable between raised and lowered positions,
    a hinge pivotally interconnecting said wing section and said main frame,
    said main frame having an elongated passageway in its end adjacent said wing section,
    a hydraulic cylinder connected at one end to said main frame and positioned in said passageway and pivotally connected at its opposite end to said wing section at a point remote from the pivotal axis of said hinge, and
    said wing section including an ear connected to said cylinder and said ear extends into said passageway in said main frame when said wing section is in said lowered position.
12. An agricultural implement comprising,
    a tool bar carrying ground working tools thereon along its substantial length; said tool bar including a main frame and at least one wing section, said wing section being pivotally movable between extended and angular positions,
    a hinge pivotally interconnecting said wing section and said main frame,
    said main frame having an elongated passageway in its end adjacent said wing section,
    a hydraulic cylinder connected at one end to said main frame and positioned in said passageway and pivotally connected at its opposite end to said wing section at a point remote from the pivotal axis of said hinge, and
    said wing section including an ear connected to said cylinder and said ear extends into said passageway in said main frame when said wing section is in said extended position.
13. An agricultural implement comprising, a tool bar carrying ground working tools thereon; said tool bar including a main frame and at least one wing section, said wing section being pivotally movable between raised and lowered positions, a hinge pivotally interconnecting said wing section and said main frame, said main frame having an elongated passageway in its end adjacent said wing section, a hydraulic cylinder connected at one end to said main frame and positioned in said passageway and pivotally connected at its opposite end to said wing section at a point remote from the pivotal axis of said hinge, and said wing section including an ear connected to said cylinder and said ear extends into said passageway in said main frame when said wing section is in said lowered position.

* * * * *